United States Patent
Nikles

[15] 3,676,441
[45] July 11, 1972

[54] 2-AMINO-4-TERTIARY BUTYLAMINO-1,3,5-TRIAZINES

[72] Inventor: Erwin Nikles, Liestal, Switzerland
[73] Assignee: Ciba-Geigy AG, Basel, Switzerland
[22] Filed: April 16, 1970
[21] Appl. No.: 29,252

[30] Foreign Application Priority Data

April 24, 1969 Switzerland .................6356/69

[52] U.S. Cl. ..................................260/249.8, 71/93
[51] Int. Cl. .............................................C07d 55/20
[58] Field of Search.................................260/249.8

[56] References Cited

UNITED STATES PATENTS 2,909,420  10/1959  Gysin et al. ...................260/249.8

Primary Examiner—John M. Ford
Attorney—Harry Goldsmith, Joseph G. Kolodny and Mario A. Monaco

[57] ABSTRACT

2-Amino-4-tertiary butylamino-1,3,5-triazines possessing in the 6-position a chlorine atom, a methoxy or a methyl-mercapto group are very effective weed killers and plant influencing agents.

4 Claims, No Drawings

2-AMINO-4-TERTIARY BUTYLAMINO-1,3,5-TRIAZINES

This invention relates to substituted 1,3,5-triazines and to herbicidal preparations containing them.

The present invention provides compounds of the general formula

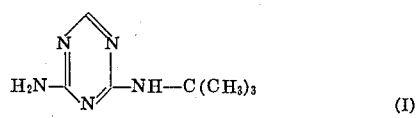

in which X represents a chlorine atom, a methoxy group or a methylthio group.

The present invention also provides herbicidal preparations which comprise, as active ingredient, at least one compound of the general formula

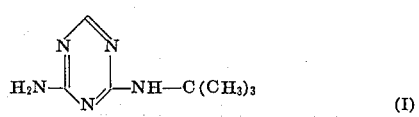

in which X represents a chlorine atom, a methoxy group or a methylthio group, if desired, in combination with a suitable carrier or distribution medium, for example, a solvent, diluent, suspending agent, emulsifying agent, wetting agent, adhesive and thickener, or other important active substances used in agriculture.

The herbicidal preparations according to the present invention preferably contain from 0.1 to 95 per cent by weight of the active ingredient.

The new herbicidal preparations ensure better control of grass weeds and other weeds in crops than the hitherto known 1,3,5-triazines, for example, in sugar cane, potatoes, rice, maize, peas, sugar beet, cotton, ground nut, plants of the cabbage family, grain and carrot. They can also be used in orchards and vineyards.

The rate of application is of the order of 0.2 to 6 kg AS/hectare, preferably 0.3 to 4 kg AS/hectare.

The compounds of the present invention are eminently suitable both for the selective control and extermination of weeds in crops and the total extermination and prevention of undesired plant growth. The term "weeds" is used herein to include previously cultivated crop plants that are undesired. The compounds defined above also have other inhibitory effects on plant growth. In particular, they act as defoliants, for example, in the case of the cotton plant. They accelerate ripening by causing premature drying out, for example, in the case of the potato plant. They also decrease fruit development, delay blossoming, prolong the harvesting period and improve the storage properties of the harvested crop. Growth inhibiting compounds can be used to improve crop yield not only by suppression of weed growth, but also by countering influences that could stimulate the growth of crops in an undesirable direction, for example, high temperatures or excessive use of fertilizers. On the other hand, the use of herbicidal preparations for the extermination of stubborn weed growth can also be useful on a long-term basis when the preparations are not sufficiently selective to prevent a reduction in crop yield at the time of application.

The preparations of the present invention for influencing plant growth and combating weeds can be made up in the form of, for example, solutions, emulsions, suspensions or dusting preparations. The form of the preparation depends on its ultimate use. The essential feature of a preparation in respect of its physical form is that it should ensure fine dispersion of the active ingredient. The effect of the active ingredient can be reinforced by the use of carriers that are themselves phytotoxic, for example, high-boiling mineral oil fractions or chlorinated hydrocarbons, this applying especially to the total extermination of plant growth, premature drying out and defoliation. On the other hand, selectivity in respect of growth inhibition tends to assert itself more when inert carriers are used, this applying, for example, to the selective control of weeds.

The solvents used for the preparation of solutions are, especially alcohols, for example, ethyl alcohol and isopropyl alcohol, ketones, for example acetone and cyclohexanone, aliphatic hydrocarbons, for example, kerosene, cyclic hydrocarbons, for example, benzene, toluene, xylene and tetrahydronaphthalene, alkylated naphthalenes, chlorinated hydrocarbons, for example, tetrachloroethane and ethylene chloride, as well as mineral and vegetable oils, and mixtures of these substances.

The aqueous preparations are preferably in the form of emulsions and dispersions. The active substances may be homogenized in water either per se or in one of the above-mentioned solvents, preferably with the aid of a wetting or dispersing agent. Quaternary ammonium compounds are examples of suitable cationic emulsifying or dispersing agents. Suitable anionic substances are, for example, soaps, soft soap, aliphatic long-chain sulphuric acid monoesters, aliphatic-aromatic sulphonic acids and long-chain alkoxy-acetic acids, and non-ionic emulsifying or dispersing agents are polyethylene ethers of fatty alcohols and polyethylene oxide condensation products. On the other hand, it is also possible to use concentrates consisting of the active ingredient, emulsifier or dispersant and, if necessary, solvent. Concentrates of this kind can be diluted with water prior to use.

Dusting preparations can be prepared by mixing the active ingredient with a solid carrier, or by grinding the two together. Suitable carriers are, for example, talcum, diatomaceous earth, kaolin, bentonite, calcium carbonate, boric acid and tricalcium phosphate, and also wood flour, cork meal, charcoal and other materials of vegetable origin. On the other hand, the substances can be absorbed on to the carrier in a volatile solvent. Pastes and preparations in powder form can be rendered capable of suspension in water by the addition of wetting agents and protective colloids and used as sprays.

Since the preparations of the present invention include both solid and liquid substances having virtually the same herbicidal action, it is simple to prepare liquid concentrates for aqueous emulsions and also powder or paste concentrates for aqueous suspensions which have a high concentration of active ingredient.

Granulates can be prepared in an especially simple manner by dissolving a compound of the general formula I in an organic solvent, allowing the solution to be taken up by a granulated material, for example, attapulgite, $SiO_2$, granulated calcium, bentonite, and the like, and then evaporating the organic solvent.

Polymer granulates can also be used. These can be prepared by mixing a compound of the general formula I with polymerizable compounds, for example urea/formaldehyde, dicyanodiamide/formaldehyde and melamine/formaldehyde, and then carrying out polymerization under mild conditions that do not affect the active substances; granulation can be carried out simultaneously. A more advantageous method is to impregnate prepared porous polymer granulates for example, urea/formaldehyde, polyacrylonitrile and polyesters, having a specified surface area and a predetermined adsorption/desorption ratio with the active substances, for example, in the form of solutions (in a low-boiling solvent) and then to remove the solvent.

Polymer granulates of the kznd specified can also be applied in the form of microgranulates preferably having a bulk density of from 300 grams/liter to 600 grams/liter by means of atomizers. The dusting of large areas of grain crops can be carried out from aircraft.

Other pesticides, fertilizers, surfactants or substances to increase the specific gravity, for example, $BaSO_4$, can, of course, be added to the granulates.

Granulates can also be obtained by compacting the carrier material with the active substance and other additives and then comminuting the mixture.

The preparations in their various forms may also contain the usual additives that improve dispersion, adhesion, rain-resistance and, if necessary, penetrating power; substances of this kind are, for example, fatty acids, resins, wetting agents, glues, casein and alginates. Their spectrum of biological action can be broadened by the addition of substances having bactericidal or fungicidal properties or that may also influence plant growth; fertilizers may also be added.

Known weed-killers may also be added to reinforce the action of the preparations of the invention or to increase their spectrum of biological action.

Examples of such substances are as follows:

Substituted ureas, for example, N-phenyl-N',N'-dimethylurea, N-(4-chlorophenyl)-N',N'-dimethylurea, N-(3,4-dichlorophenyl)-N',N'-dimethylurea, N-(4-chlorophenyl)-N'-methoxy-N'-methylurea, N-(3,4-dichlorophenyl)-N'-methoxy-N'-methylurea, N(4-bromophenyl)-N'-methoxy-N'-methylurea, N(4-bromo-3-chlorophenyl)-N'-methoxy-N'-methylurea, N(4-chlorophenyl)-N'-methyl-N'-butylurea, N(4-chlorophenyl)-N'-methyl-N'-isobutylurea and N(-chlorophenoxyphenyl)-N',N'-dimethylurea;

Substituted triazines, for example, 2-chloro-4,6-bis(ethylamino)-s-triazine, 2-chloro-4-ethylamino-6-isopropylamino-s-triazine, 2-chloro-4,6-bis(methoxypropylamino)-s-triazine, 2-methoxy-4,6-bis(isopropylamino)-s-triazine, 2-diethylamino-4-isopropylacetamido-6-methoxy-s-triazine, 2-isopropylamino-4-methoxyethylamino-6-methyl-mercapto-s-triazine, 2-methylmercapto-4,6-bis(isopropylamino)-s-triazine, 2-methylmercapto-4,6-bis-(ethylamino)-s-triazine, 2-methylmercapto-4-ethylamino-6-isopropylamino-s-triazine, 2-methoxy-4,6-bis(ethylamino)-s-triazine, 2-methoxy-4-ethylamino-6-isopropylamino-s-triazine and 2-chloro-4,6-bis(isopropylamino)-s-triazine; (these triazines can be mixed with the compounds of general formula I in ratios of from 1 : 10 to 20 : 1);

Phenols, for example, dinitro-sec.-butylphenol or the salts thereof and pentachlorophenol or the salts thereof;

Carboxylic acids, for example, 2,3,6-trichlorobenzoic acid and salts, 2,3,5,6-tetrachlorobenzoic acid and salts, 2-methoxy-3,5,6-trichlorobenzoic acid and salts, 2-methoxy-3,6-dichlorobenzoic acid and salts, 3-amino-2,5-dichlorobenzoic acid and salts, 3-nitro-2,5-dichlorobenzoic acid and salts, 2-methyl-3,6-dichlorobenzoic acid and salts, 2,4-dichlorophenoxyacetic acid and salts and esters, 2,4,5-trichlorophenoxyacetic acid and salts and esters, (2-methyl-4-chlorophenoxy)acetic acid and salts and esters, 2-(2,4,5-trichlorophenoxy)propionic acid and salts and esters, 2-(2,4,5-trichlorophenoxy)ethyl-2',2'-dichloroproprionate, 4-(2,4-dichlorophenoxy)butyric acid and salts and esters and 4-(2-methyl-4-chlorophenoxy)butyric acid and salts and esters;

Carbamic acid derivatives, for example, carbanilic acid isopropylester, meta-chlorocarbanilic acid isopropylester, meta-chlorocarbanilic acid-4-chloro-2-butinylester and metatrifluoromethylcarbanilic acid isopropylester; and Various other compounds, for example, 2,3,6-trichlorophenylacetic acid, chloroacetic acid diallylamide, maleic acid hydrazide, sodium salt of methylarsonic acid, borates, 3-aminotriazole, pyrazine derivatives, for example, pyramine, endooxohexahydrophthalic acid, diphenylacetonitrile, Treflan, N-methoxymethylene-N-chloroacetyl-2,6-diethylaniline, Balan, Planavin, tetrachlorophthalic acid dimethylester, 4-trifluoromethyl-2,4'-dinitrodiphenylether, 2,4-dichloro-4'-nitrodiphenylether, 3-cyclohexyl-6-methyluracil, 3-cyclohexyl-6-sec.-butyluracil, 3-cyclohexyl-5-bromouracil, 3-cyclohexyl-5-chlorouracil, 3-isopropyl-5-chlorouracil, 3-isopropyl-5-bromouracil, and other known uracils.

The parts and percentages in the following manufacturing examples are by weight.

EXAMPLE 1

2-Amino-4-tertiary butylamino-6-chloro-1,3,5-triazine 330 parts of 2-amino-4,6-dichloro-1,3,5-triazine were suspended in 3,000 parts by volume of toluene. 300 parts of tertiary butylamine were added dropwise to the suspension at 10° C and the batch stirred for 14 hours at 40° C. The precipitate that formed was removed by filtration, the filtrate concentrated to a small volume and allowed to stand.

The product that crystallizes out was isolated by filtration and washed with toluene and hexane. Melting point: 145° – 146° C.

EXAMPLE 2

2-Amino-4-tertiary butylamino-6-methoxy-1,3,5-triazine

A sodium methylate solution was prepared from 38 parts of sodium and 1,800 parts by volume of methanol. 302 parts of the 2-amino-4-tertiary butylamino-6-chloro-1,3,5-triazine prepared in accordance with Example 1 were added to the solution at room temperature.

The mixture was refluxed for 24 hours and then diluted with 4,000 parts of water.

The finely crystalline product was isolated by filtration, washed with water and dried. Melting point: 138° – 140° C.

EXAMPLE 3

2-Amino-4-tertiary butylamino-6-methylmercapto-1,3,5-triazine

A sodium isopropylate solution was prepared from 38 parts of sodium and 1,500 parts by volume of isopropanol. 85 parts of methylmercaptan were run into the solution at 0° C. 302 parts of the 2-amino-4-tertiary butylamino-6-chloro-1,3,5-triazine prepared in accordance with Example 1 were then introduced and the mixture kept at 80° C for 14 hours. The batch was then diluted with 3,000 parts of water, cooled, and the precipitate isolated by filtration.

The colorless product was washed with water. Melting point: 142° – 144° C.

EXAMPLE 4

Wettable powders

A wettable powder was prepared by mixing and finely grinding the following components. The powder is soluble in water.

50 parts of an active ingredient according to the present invention,
20 parts of highly adsorptive silica
25 parts of *Bolus alba* (kaolin)
1.5 parts of sodium 1-benzyl-2-stearylbenzimidazole-6,3'-disulphonate
3.5 parts of the reaction product derived from paratertiary octylphenol and ethylene oxide.

Emulsion concentrates a. A mixture was prepared from 40 parts of a compound of the general formula I and 10 parts of a mixture comprising an anionic surface-active compound, preferably the calcium or magnesium salt of monolaurylbenzenemonosulphonic acid, and a non-ionic surface-active compound, preferably a polyethyleneglycol ether of monosorbitollaureate, and the whole dissolved in a small amount of xylene. The batch was bulked to 100 ml with xylene, and a clear solution obtained that can be used as a spray concentrate. A stable emulsion is produced by the addition of water.

b. An emulsion concentrate can also be formulated according to the following procedure when active ingredients having good solubility are used:

20 parts of active ingredients,
70 parts of xylene and
10 parts of a mixture comprising the reaction product obtained from an alkylphenol and ethylene oxide, and calcium dodecylbenzenesulphonate are mixed. An emulsion suitable for spraying can be obtained by diluting the mixture to the desired concentration with water.

Granulates a. 7.5 parts of one of the compounds of the general formula I were dissolved in 100 ml of acetone, and the solution obtained added to 92 grams of granulated attapulgite (mesh size: 24/28 meshes per inch). The batch was well mixed and the solvent removed in a rotary evaporator. A granulate having an active substance content of 7.5 percent was obtained.

b. A 10 percent polymer granulate was obtained by dissolving from 1,050 to 1,100 grams of a compound of the general formula I in 2 liters of trichloroethylene and spraying the solution on to 9,230 grams of porous urea/formaldehyde granulate in a fluidized bed granulator at a pressure of 1.5 atmospheres gauge. The solvent was removed by raising the temperature of the fluidization air to about 50° C.

c. A 7.5 percent weighted granulated was obtained by compressing and mixing 770 grams of a compound of the general formula I, 500 grams of $BaSO_4$, 1,000 grams of urea and 7,730 grams of porous polyacrylonitrile powder on a roller mill and then breaking up the material to the desired grain size.

EXAMPLE 5

Method:

Plant seeds were sown in a series of earthenware pots in a greenhouse.

In the preemergent test, the soil was sprayed with a given concentration of a spray prepared in accordance with the formulation example one day after sowing.

In the postemergent test, treatment was carried out with the same spray about 10–12 days after sowing when the plants were in the two-leaf or three-leaf stage.

Assessment is made 20 days after sowing.

The results of the tests are given in the following tables, comparison being made between the triazines of the present invention and the known 1,3,5-triazines that are most closely related chemically.

1. Compound 1 compared with 2-amino-4-isopropylamino-6-methylmercapto-1,3,5-triazine (A) and 2-ethylamino-4-isopropylamino-6-chloro-1,3,5-triazine (ATRAZIN)

Postemergent treatment

| compound 1 | | compound A (known) | | Atrazin (known) | |
|---|---|---|---|---|---|
| kgAS/hectare 2 | 1 | 2 | 1 | 2 | 1 |
| Zea mays 2 | 2 | 2 | 1 | 1 | 1 |
| Digitaria 9 | 9 | 9 | 8 | 2 | 1 |
| Pancium 9 | 5 | 8 | 5 | 7 | 6 |
| Poa 9 | 9 | 8 | 8 | 9 | 9 |
| Alopecurus 9 | 9 | 8 | 8 | 9 | 9 |
| Galium 9 | 9 | 7 | 4 | 9 | 9 |
| Calendula 9 | 9 | 8 | 8 | 9 | 9 |
| Chrysanthenum 9 | 9 | 9 | 9 | 9 | 9 |
| Ipomoea 9 | 9 | 9 | 9 | 9 | 9 |

Compound 1 shows a distinctly broader spectrum of action as a weed killer than the known Compound A without any damage to the maize crop. The commercial product ATRAZIN is completely innocuous towards *Digitaria*, one of the most important field weeds, whereas Compound 1 totally destroys this weed at both rates of application (2 kg/hectare and 1 kg/hectare).

2. Compound 2 compared with 2-amino-4-isopropylamino-6-chloro-1,3,5-triazine (B)

Postemergent treatment

| Compound 2 | | | Compound B (known) | | |
|---|---|---|---|---|---|
| kgAS/hectare 3 | 1.5 | 0.75 | 3 | 1.5 | 0.75 |
| Avena 9 | 9 | 8 | 9 | 7 | 7 |
| Zea mays 2 | 1 | 1 | 1 | 1 | 1 |
| Digitaria 9 | 6 | 3 | 4 | 3 | 1 |
| Poa 9 | 9 | 9 | 7 | 6 | 4 |
| Alopecurus 9 | 9 | 9 | 9 | 8 | 6 |
| Galium 9 | 9 | 9 | 9 | 8 | 4 |
| Calendula 9 | 9 | 9 | 9 | 9 | 3 |
| Chrysanthenum 9 | 9 | 9 | 9 | 9 | 9 |
| Ipomoea 9 | 9 | 9 | 9 | 9 | 7 |

Compound 2 shows a distinctly broader spectrum of action as a weed killer than the known Compound B.

Preemergent treatment

| compound 2 | | compound B (known) | |
|---|---|---|---|
| kgAS/hectare 3 | 1.5 | 3 | 1.5 |
| Avena 9 | 9 | 9 | 8 |
| Zea mays 2 | 1 | 3 | 2 |
| Poa 9 | 9 | 9 | 8 |
| Alopecurus 9 | 9 | 9 | 7 |
| Galium 9 | 8 | 7 | 5 |
| Calendula 9 | 9 | 9 | 9 |
| Chrysanthenum 9 | 9 | 9 | 9 |
| Ipomoea 9 | 9 | 9 | 9 |

In the preemergent treatment, the selective herbicidal action of Compound 2 is much better than that of the control Compound B.

3. Compound 3 compared with 2-amino-4-isopropylamino-6-methoxy-1,3,5-triazine (PROMETRYN)

Preemergent treatment

| Compound 3 | | | Prometryn (known) | | |
|---|---|---|---|---|---|
| kgAS/hectare 2 | 1 | 0.5 | 2 | 1 | 0.5 |
| Avena 8 | 7 | 4 | 6 | 5 | 3 |
| Digitaria 9 | 6 | 3 | 4 | 3 | 3 |
| Poa 9 | 8 | 5 | 7 | 5 | 3 |
| Alopecurus 9 | 7 | 4 | 4 | 4 | 3 |
| Galium 5 | 3 | 2 | 4 | 4 | 3 |
| Calendula 9 | 6 | 3 | 4 | 4 | 3 |
| Chrysanthenum 9 | 9 | 7 | 9 | 9 | 7 |
| Ipomoea 9 | 9 | 5 | 4 | 4 | 4 |
| Stellaria 9 | 9 | 7 | 9 | 6 | 6 |
| Gossypium 2 | 1 | 1 | 4 | 2 | 1 |

When compound 3 is used in cotton (*Gossypium*) as compared with PROMETRYN, the known product shows much less selectivity than the compound of the invention.

I claim:

1. A compound of the general formula

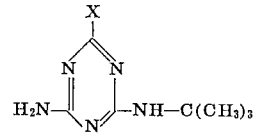

in which X represents a chlorine atom, a methoxy group or a methylthio group.

2. A compound according to claim 1 in which X is chlorine.

3. A compound according to claim 1 in which X is a methoxy group.

4. A compound according to claim 1 in which X is a methylthio group.

* * * * *